(12) United States Patent
Fishman (10) Patent No.: US 11,636,186 B1
(45) Date of Patent: Apr. 25, 2023

(54) LOCATION-BASED AUGMENTED REALITY (AR) ADMINISTRATION AND MANAGEMENT

(71) Applicant: Richard Fishman, Parkland, FL (US)

(72) Inventor: Richard Fishman, Parkland, FL (US)

( * ) Notice: Subject to any disclaimer, the term of this patent is extended or adjusted under 35 U.S.C. 154(b) by 0 days.

(21) Appl. No.: 17/554,018

(22) Filed: Dec. 17, 2021

(51) Int. Cl.
*G06F 21/62* (2013.01)
*G06F 21/32* (2013.01)
*G06F 21/31* (2013.01)
*G06F 3/01* (2006.01)

(52) U.S. Cl.
CPC .............. *G06F 21/31* (2013.01); *G06F 3/011* (2013.01)

(58) Field of Classification Search
CPC .................................. G06F 21/31; G06F 3/011
USPC .......................................................... 726/19
See application file for complete search history.

(56) References Cited

U.S. PATENT DOCUMENTS

| | | | | |
|---|---|---|---|---|
| 7,509,639 | B2 * | 3/2009 | Worley, Jr. .............. | G06F 9/545 718/1 |
| 2007/0266141 | A1 * | 11/2007 | Norton .................. | H04L 61/303 709/224 |
| 2016/0026253 | A1 * | 1/2016 | Bradski ................ | H04N 13/128 345/8 |
| 2018/0220312 | A1 * | 8/2018 | Guttenfelder ........... | G01S 19/23 |
| 2019/0094981 | A1 * | 3/2019 | Bradski ................... | G06F 3/017 |
| 2022/0103566 | A1 * | 3/2022 | Faulkner ............... | H04L 67/535 |

OTHER PUBLICATIONS

Matt Dunleavy; Augmented Reality Teaching and Learning; Springer:2014; pp. 735-745.*

* cited by examiner

Primary Examiner — Monjur Rahim
(74) Attorney, Agent, or Firm — Gearhart Law LLC (57) ABSTRACT

A method and a system for providing location-based augmented reality (AR) administration and management are described herein. An AR engine of a computing device receives login credentials from a user, identifies the user based on the login credentials and a privilege level associated with the user, and grants the user access to the AR engine based on the identity of the user and the privilege level associated with the user. The AR engine also selects the user to have enhanced privileges based on the identity of the user and the privilege level associated with the user. The enhanced privileges comprise granting the user increased interaction capabilities with digitally created content by the AR engine. The AR engine engages a GPS engine and/or a camera of the computing device to create a defined area in the real world for the user. If the GPS engine determines that the user is within the defined area, the user is provided the enhanced privileges. If the GPS engine determines that the user is outside of the defined area, the user is prohibited from utilizing the enhanced privileges.

20 Claims, 3 Drawing Sheets

LOCATION-BASED AUGMENTED REALITY (AR) ADMINISTRATION AND MANAGEMENT

CROSS-REFERENCE TO RELATED APPLICATIONS

This application is a U.S. Non-Provisional Patent application that does not claim priority to any other application.

FIELD OF THE EMBODIMENTS

The field of the invention and its embodiments relate to a location-based augmented reality (AR) administration and management.

BACKGROUND OF THE EMBODIMENTS

Recently, augmented reality (AR) techniques have become increasingly popular. In general, AR is a live, direct or indirect, view of a physical, real-world environment whose elements are augmented by computer-generated sensory input, such as sound, video, graphics or GPS data. Distinctly, virtual reality systems replace the real world with a simulated one. As a first example, marker-based AR techniques are based on the computer identifying artificial markers in the real world (such as QR codes, barcodes, or similar markers) and superimpose computer-generated images based on where the markers are located. This area requires significant image processing tasks done by the computer. Positional-based AR techniques are based on where the user is located, where the user is pointing to, and where the objects of interest are located relative to the user. The computer then will superimpose images on top of the real-world image gathered. The computer doesn't need to do much image processing (almost none at all) except for superimposing the generated image on top of the camera image. In other examples, object/feature recognition techniques involve the computer recognizing real-world objects directly and thus the markers are no longer needed. However, none of these AR systems allow the user to have enhanced privileges or capabilities when present within a specific location or a defined area. The instant invention provides this solution.

Examples of Related Art Include

U.S. Pat. No. 11,012,595 B2 describes a method and system of training one or more digital assets, such as two-dimensional and three-dimensional computer-generated objects, which are superimposed over a live camera view to generate a simulated training scenario, referred to as AR technology. By leveraging AR technology, a live simulation of real-world events, situations, and skills is generated for which an employee, student, customer, or any type of person in need of training, is being trained. A trainee is thus immersed directly into the training material. The physical environment and working conditions are integrated into the sequence of training material, and it does this live, that is, with immediate feedback from a camera's live screen view. This technique may, by way of examples, also be described as an automated guided tour used to facilitate employee on-boarding and training, or as a guided tour through a warehouse store for its customers.

U.S. Published Patent Application No. 2020/0184725 A1 describes a method for operating an aircraft that includes an autonomous decision making system which can be an aircraft augmented reality system. The aircraft augmented reality system can include a data module, an environment module, and a display module. The aircraft augmented reality system can receive information and environmental data to display augmented reality data on a windshield in the cockpit of an aircraft.

WO 2019/079826 A1 describes systems and methods of digital assistants in an augmented reality environment and local determination of virtual object placement. Apparatuses of single or multi-directional lens as portals between a physical world and a digital world component of the augmented reality environment are also disclosed. In one aspect, embodiments of the present disclosure include a method, which may be implemented on a system, to present, a digital assistant to the user. Responsive to receiving a command, the digital assistant can trigger an operation on the augmented reality environment such that the user is able to engage with the augmented reality environment via the user interface. The method can further include training the digital assistant to learn from the activities occurring in the augmented reality environment and/or behaviors of the user from the action or the interaction with the real world environment.

U.S. Pat. No. 9,779,553 B2 describes a system and method for defining a location-specific augmented reality capability for use in portable devices having a camera. The system and method uses recent photographs or digital drawings of a particular location to help the user of the system or method position the portable device in a specific place. Once aligned, a digital scene is displayed to the user transposed over (and combined with) the camera view of the current, real-world environment at that location, creating an augmented reality experience for the user.

U.S. Published Patent Application No. 2012/0113144 A1 describes a system, method, and computer program product for automatically combining computer-generated imagery with real-world imagery in a portable electronic device by retrieving, manipulating, and sharing relevant stored videos, preferably in real time. A video is captured with a hand-held device and stored. Metadata including the camera's physical location and orientation is appended to a data stream, along with user input. The server analyzes the data stream and further annotates the metadata, producing a searchable library of videos and metadata. Later, when a camera user generates a new data stream, the linked server analyzes it, identifies relevant material from the library, retrieves the material and tagged information, adjusts it for proper orientation, then renders and superimposes it onto the current camera view so the user views an augmented reality.

U.S. Published Patent Application No. 2018/0232953 A1 describes a system and method for defining a location-specific augmented reality capability for use in portable devices having a camera. The system and method uses recent photographs or digital drawings of a particular location to help the user of the system or method position the portable device in a specific place. Once aligned, a digital scene is displayed to the user transposed over (and combined with) the camera view of the current, real-world environment at that location, creating an augmented reality experience for the user.

Some similar systems exist in the art. However, their means of operation are substantially different from the present disclosure, as the other inventions fail to solve all the problems taught by the present disclosure.

SUMMARY OF THE EMBODIMENTS

The present invention and its embodiments relate to a location-based augmented reality (AR) administration and management.

A first embodiment of the present invention describes a method executed by a computing device for providing location-based AR administration and management. The computing device includes, at least, an AR engine, a global positing system (GPS) engine, and a camera. The method includes numerous process steps, such as: receiving, via the AR engine, login credentials from a user; identifying, by the AR engine, the user based on the login credentials and a privilege level associated with the user; and granting the user access to the AR engine based on the identity of the user and the privilege level associated with the user. It should be appreciated that in examples, the login credentials may include a username and a password or a biometric identification method (e.g., a fingerprint identification method, a facial recognition method, a palm print identification method, an iris recognition method, and/or a retina recognition method, among others).

The AR engine is then configured to select the user to have enhanced privileges based on the identity of the user and the privilege level associated with the user. The enhanced privileges include increased interaction capabilities with digitally created content by the AR engine, where the digitally created content comprises textual content, two-dimensional (2D) content, three-dimensional (3D) content, video content, and/or audio content.

The AR engine also engages the GPS engine and/or the camera to create a defined area in the real world for the user. In some examples, the AR engine is further configured to modify a size of the defined area based on one or more factors or parameters. Next, if the GPS engine determines that the user is within the defined area, the AR engine provides the user with the enhanced privileges. If the GPS engine determines that the user is outside of the defined area, the AR engine prohibits the user from interacting with the enhanced privileges. Moreover, if the GPS engine determines that the user moves from a location inside the defined area to another location outside of the defined area, the GPS engine may prohibit or revoke the users enhanced privileges.

Furthermore, in some examples, the GPS engine may determine that one or more other users are within the defined area. In this scenario, the GPS engine transmits a notification to the AR engine. Next, the AR engine identifies the privilege level for each of the one or more other users within the defined area and, if the AR engine determines that the privilege level for a subset of the one or more other users exceeds a predetermined privilege level, the AR engine provides the enhanced privileges in the defined area to the subset of the one or more other users.

A second embodiment of the present invention describes a computer system. The computer system comprises one or more processors, one or more memories, and one or more computer-readable hardware storage devices. The one or more computer-readable hardware storage devices contain program code executable by the one or more processors via the one or more memories to implement a method for providing location-based augmented reality (AR) administration and management.

The method includes numerous process steps, such as: receiving login credentials from a user; identifying the user based on the login credentials and a privilege level associated with the user; granting the user access to an application of the computer system based on the identity of the user and the privilege level associated with the user; and selecting the user to have enhanced privileges based on the identity of the user and the privilege level associated with the user. The enhanced privileges comprise increased interaction capabilities with digitally created content, where the digitally created content is textual content, two-dimensional (2D) content, three-dimensional (3D) content, video content, and/or audio content.

Further, the method includes: creating a defined area in the real world for the user. In some examples, a size of the defined area may be modified. Further, if the user is within the defined area, the method includes providing the enhanced privileges to the user. If the user is outside of the defined area, the method includes prohibiting the user from utilizing the enhanced privileges. If the user moves from a location inside of the defined area to another location outside of the defined area, the method prohibits the user from utilizing the enhanced privileges.

In further examples, the method comprises: determining that one or more other users are within the defined area. Next, the method includes identifying the privilege level for each of the one or more other users within the defined area; determining that the privilege level for a subset of the one or more other users exceeds a predetermined privilege level; and providing the enhanced privileges in the defined area to the subset of the one or more other users.

A third embodiment of the present invention describes a computing device that includes, at least, an augmented reality (AR) engine, a global positioning system (GPS) engine, and a camera. The AR engine is configured to: receive login credentials from a user; identify the user based on the login credentials and a privilege level associated with the user; grant the user access to the AR engine based on the identity of the user and the privilege level associated with the user; and select the user to have enhanced privileges based on the identity of the user and the privilege level associated with the user. The enhanced privileges comprise increased interaction capabilities with digitally created content by the AR engine, where the digitally created content includes textual content, two-dimensional (2D) content, three-dimensional (3D) content, video content, and/or audio content.

The AR engine is also configured to engage the GPS engine and/or the camera to create a defined area in the real world for the user. The GPS engine is configured to: determine that the user is within the defined area and provide the enhanced privileges to the user. Moreover, if the GPS engine determines that the user is outside of the defined area or has moved from a location inside of the defined area to another location outside of the defined area, the GPS engine prohibits the user from utilizing the enhanced privileges.

In some examples, the GPS engine is also configured to: determine that one or more other users are within the defined area; and determine a notification to the AR engine that the one or more other users are within the defined area. Next, the AR engine is configured to: identify the privilege level for each of the one or more other users within the defined area; determine that the privilege level for a subset of the one or more other users exceeds a predetermined privilege level; and provide the enhanced privileges in the defined area to the subset of the one or more other users.

DESCRIPTION OF THE PREFERRED EMBODIMENTS

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As described herein, "augmented reality" or "AR" is a real-time direct or indirect view of a physical real-world environment that has been enhanced/augmented by adding virtual computer-generated sensory inputs, such as GPS, graphics, video, sound, data statistics, etc. AR is both interactive and registered in 3D, and further combines real and virtual objects. In contrast to virtual reality, which replaces the real-world environment with a simulated one, augmented reality elements are often displayed in real-time in semantic context with elements of the real-world environment.

AR is divided into the following areas from an algorithmic standpoint: (1) marker-based AR; (2) positional-based AR; and (3) object/feature recognition AR. Marker-based AR is based on a computing device or computer identifying artificial markers in the real world (such as QR codes, barcodes, or similar markers) and superimpose computer-generated images based on where the markers are located. Positional-based AR is based on where a user is located, where the user is pointing to, and where the objects of interest are located relative to the user. The computing device then superimposes images on top of the real-world image gathered. With object/feature recognition AR, the computing device recognizes real-world objects directly, and as such, markers are no longer needed.

Figure 1:
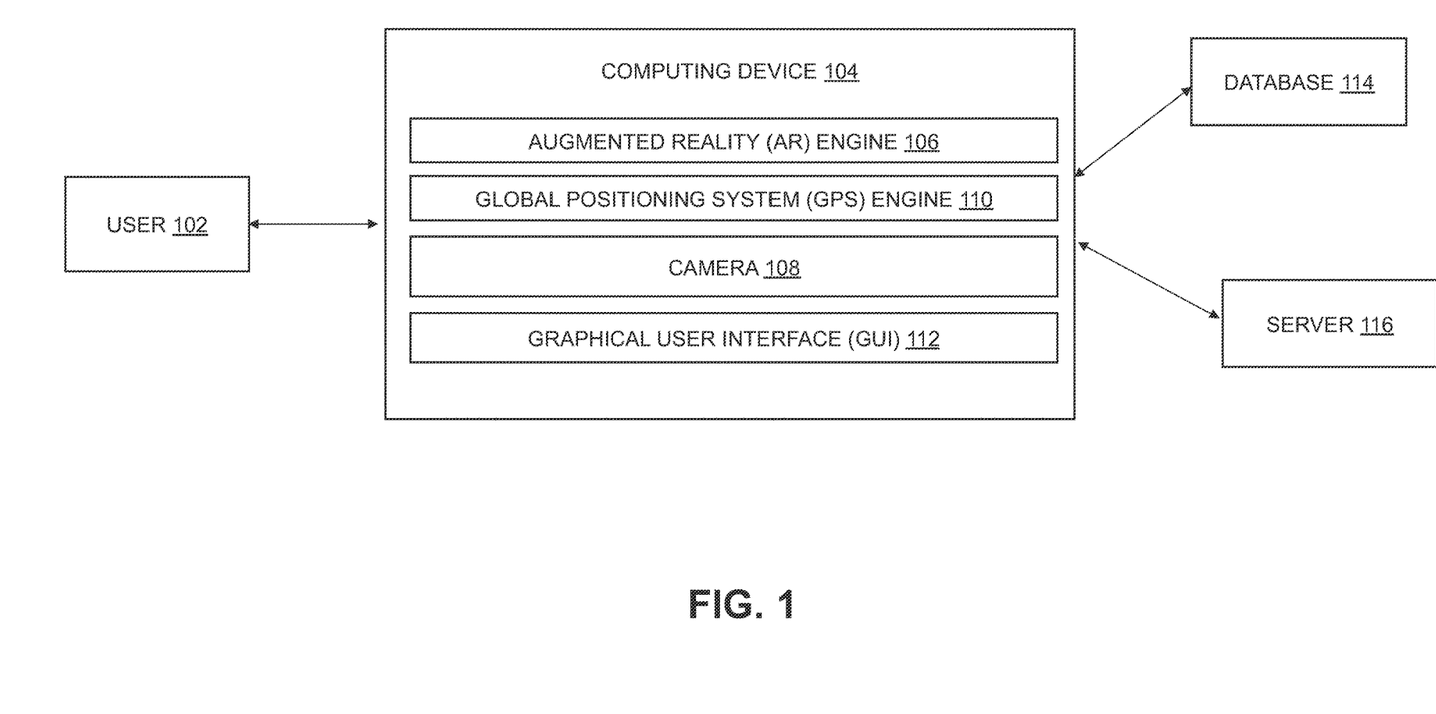
FIG. 1 depicts a schematic diagram of a computer system configured to implement a method for providing location-based AR administration and management, according to at least some embodiments disclosed herein.

A computer system configured to implement a method for providing location-based augmented reality (AR) administration and management is depicted in FIG. 1. The computer system of FIG. 1 includes at least a computing device 104. The computing device 104 may be a computer, a laptop computer, a smartphone, and/or a tablet, among other examples not explicitly listed herein. The computing device 104 may include numerous modules, applications, or engines, such as an augmented reality (AR) engine 106 and a global positioning system (GPS) engine 110, among others. In examples, the GPS engine 110 may additionally include gyroscopes or accelerometers to make the computing device 104 location-aware. In other examples, one or more sensors may be used, such as inertial sensors.

It should be appreciated that in some implementations, the AR engine 106 and/or the GPS engine 110 may be applications, software programs, services, or software platforms configured to be executable on the computing device 104. Other devices, such as a camera 108, may be configured in the computing device 104 or may be external to and connected with the computing device 104. The AR engine 106 and/or the GPS engine 110 may interact with an external database 114 and/or an external server 116, among other external systems not explicitly described herein.

Further, a user 102 may interact with the computing device 104 via a graphical user interface (GUI) 112. In examples, the user 102 may interact with the GUI 112, where such interaction may include the user 102 submitting login credentials to gain access to the AR engine 106. The login credentials may include a username and a password or a biometric identification means or method (such as a fingerprint identification method, a facial recognition method, a palm print identification method, an iris recognition method, and/or a retina recognition method, among others). In response, the AR engine 106 of FIG. 1 may identify the user 102 based on the login credentials, as well as a privilege level associated with the user 102, and may grant the user 102 access to the AR engine 106. In other examples, the AR engine 106 of FIG. 1 may fail to identify the user 102 based on the login credentials and may prompt the user 102 to create a profile to be able to access the AR engine 106.

Figure 2:
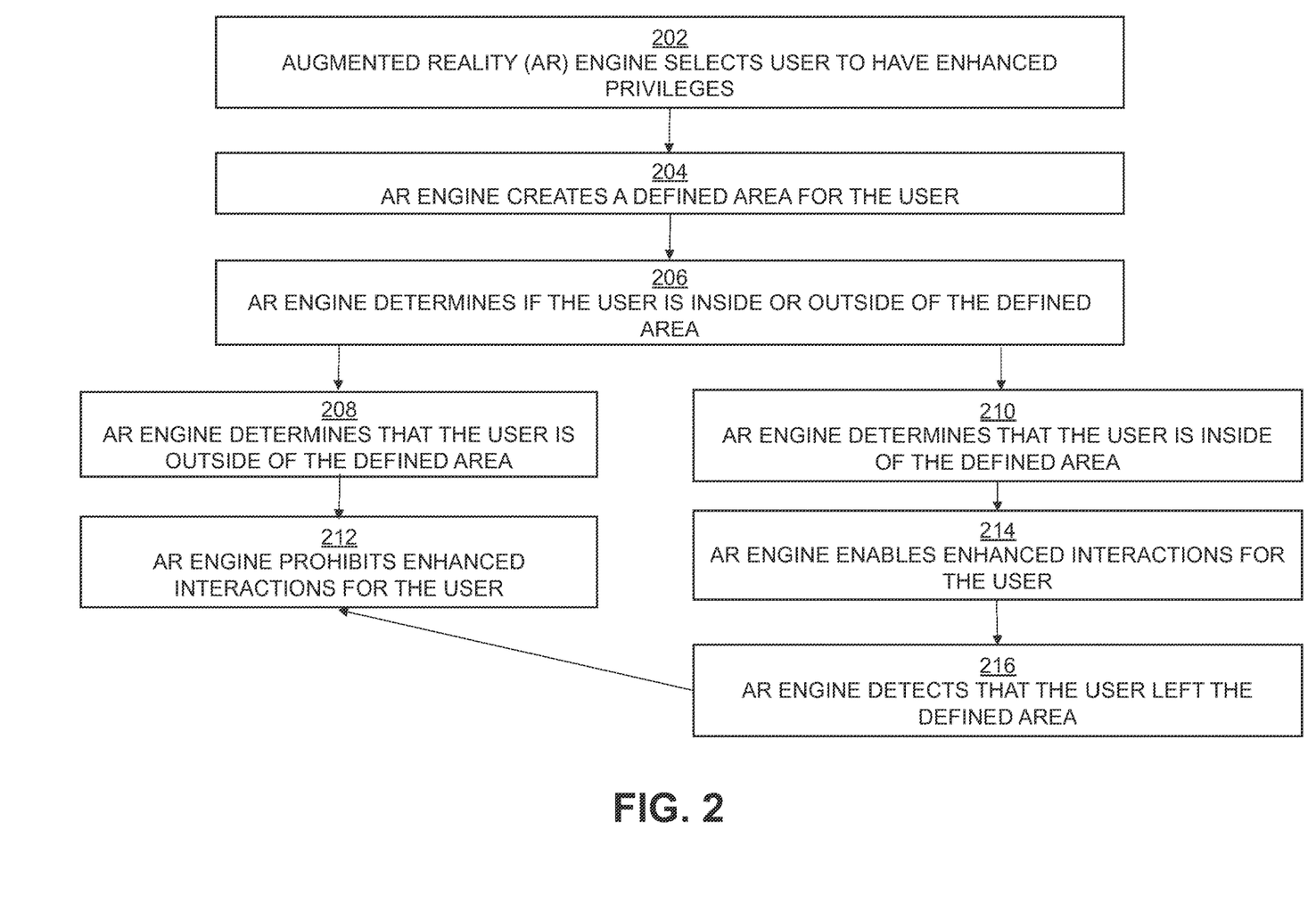
FIG. 2 depicts a block diagram of a method for providing location-based AR administration and management, according to at least some embodiments disclosed herein.

FIG. 2 depicts a block diagram of a method for providing location-based AR administration and management, according to at least some embodiments disclosed herein. The method of FIG. 2 includes begins with a process step 202, where the AR engine 106 selects the user 102 to have enhanced privileges. This selection may be based on the privilege level associated with the user 102, or may be based on other factors or parameters.

A process step 204 follows the process step 202 and includes the AR engine 106 engaging the GPS engine 110 and/or the camera 108 to create a defined area in the real world for the user 102. The defined area may be determined by one or more techniques.

A process step 206 follows the process step 204 and includes the AR engine 106 engaging the GPS engine 110 to determine if the user 102 is inside or outside of the defined area created at the process step 204. If the AR engine 106 determines that the user 102 is outside of the defined area (e.g., at a process step 208), the method of FIG. 2 moves to a process step 212, where the AR engine 106 prohibits the enhanced interactions for the user 102. If the AR engine 106 determines that the user 102 is inside of the defined area (e.g., at a process step 210), the method of FIG. 2 moves to a process step 214, where the AR engine 106 enables the enhanced interactions for the user 102.

As described herein, the "enhanced interactions" refers to the user 102 being granted increased privileges for interacting with the AR environment. Specifically, the "enhanced interactions" refers to the user 102 being granted increased privileges for interacting with digitally created content by the AR engine 106, such as textual content, two-dimensional (2D) content, three-dimensional (3D) content, video content, and/or audio content. The defined areas of enhanced privilege can vary in size and multiple people may have privileges in a single area.

It should be appreciated that the AR environment may be created by one or more methods. In some examples, the AR environment may be created by the following process steps: acquiring an image of a real-world scene and metadata with the camera 108; storing the image and the metadata (e.g., in the database 114); retrieving, from the database 114, at least one stored image with metadata having selected features; manipulating the retrieved image; combining the manipulated image with a currently observed real-world scene viewed with the computing device 104; and providing guide information related to the selected features.

In some examples, location-based AR techniques may be used to determine the location or orientation of the computing device 104 using the GPS engine 110 or other sensors, then overlay the camera 108 display with information relevant to the place or direction. In other examples, vision-based AR techniques may be used, which attempt to model precise descriptions of the shape and location of the real objects in the environment using image processing techniques or predefined markers, and use the information obtained to align the virtual graphical overlay.

A process step 216 follows the process step 214 and includes the AR engine 106 determining that the user 102 has left or is outside of the defined area. In response to the process step 216, the method of FIG. 2 moves to the process step 212 (e.g., where the AR engine 106 prohibits the enhanced interactions for the user 102).

Figure 3:
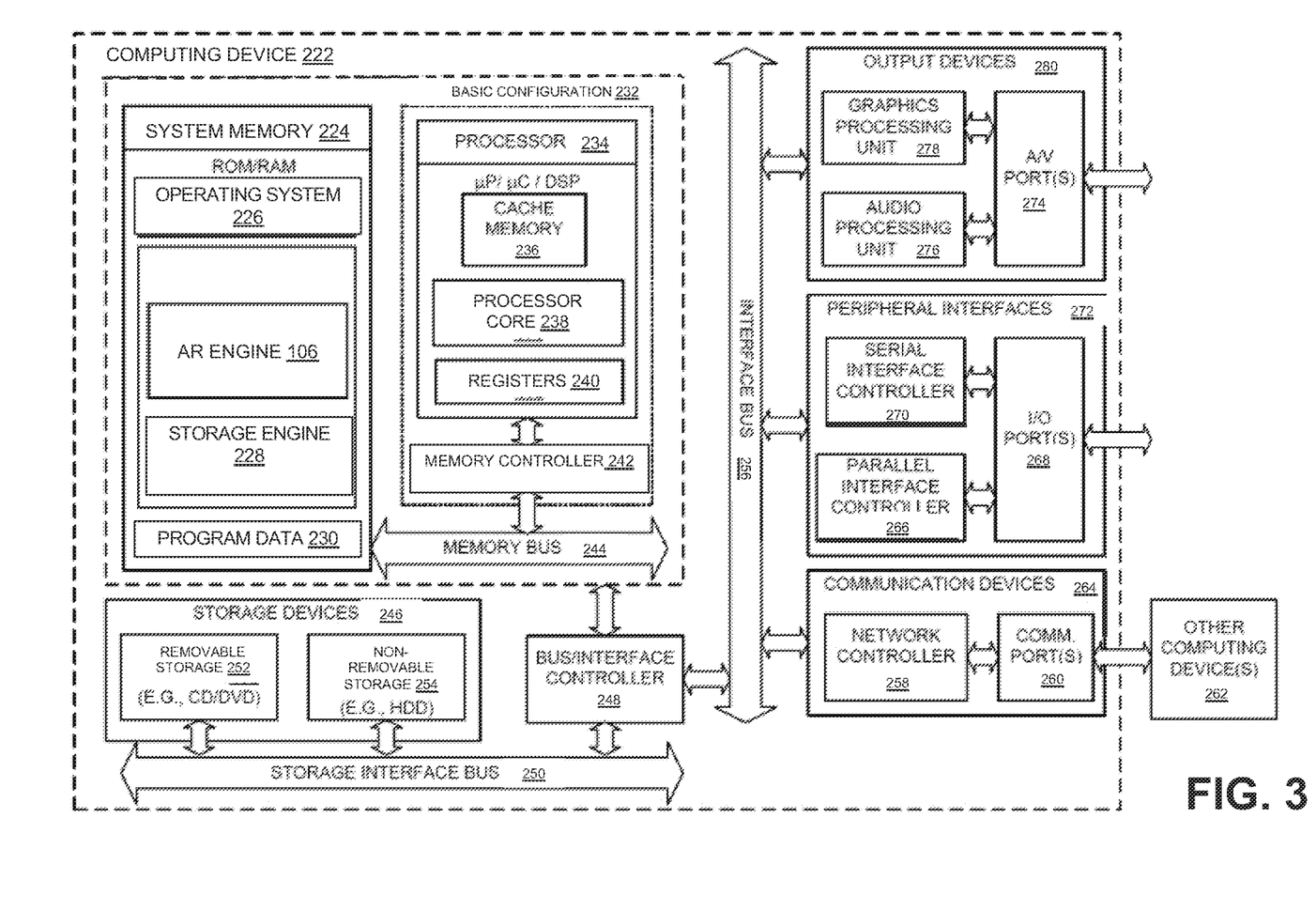
FIG. 3 depicts a block diagram of a computing device included within a computer system of FIG. 1 that is configured to implement a method for providing location-based AR administration and management, according to at least some embodiments disclosed herein.

FIG. 3 is a block diagram of a computing device included within the computer system of FIG. 1 that is configured to implement a method for providing location-based augmented reality (AR) administration and management. In some embodiments, the present invention may be a computer system, a method, and/or the computing device 104 (of FIG. 1) or the computing device 222 (of FIG. 3). A basic configuration 232 of a computing device 222 is illustrated in FIG. 3 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (μP), a microcontroller (μC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as the AR engine 106, and program data 230. In some embodiments, the AR engine 106 may be an application, a software program, a service, or a software platform, as described infra. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps for providing location-based AR administration and management. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method executed by a computing device for providing location-based augmented reality (AR) administration and management, the method comprising:
   receiving, via an augmented reality (AR) engine of a computing device, login credentials from a user;
   identifying, by the AR engine, the user based on the login credentials and a privilege level associated with the user;
   granting the user access to the AR engine based on the identity of the user and the privilege level associated with the user;
   selecting the user to have enhanced privileges based on the identity of the user and the privilege level associated with the user;
   engaging, by the AR engine, a global positing system (GPS) engine and/or a camera of the computing device to create a defined area in the real world for the user;
   determining, via the GPS engine, if the user is within the defined area; and
   in response to a determining that the user is within the defined area, providing the enhanced privileges to the user via the AR engine.

2. The method of claim 1, wherein the login credentials comprise a username and a password or a biometric identification method.

3. The method of claim 2, wherein the biometric identification method is selected from the group consisting of: a fingerprint identification method, a facial recognition method, a palm print identification method, an iris recognition method, and a retina recognition method.

4. The method of claim 1, further comprising:
   in response to a determining that the user is outside of the defined area, prohibiting the user from utilizing the enhanced privileges via the AR engine.

5. The method of claim 1, wherein the enhanced privileges comprise granting the user increased interaction capabilities with digitally created content by the AR engine.

6. The method of claim 5, wherein the digitally created content is selected from the group consisting of: textual content, two-dimensional (2D) content, three-dimensional (3D) content, video content, and audio content.

7. The method of claim 1, further comprising:
   modifying a size of the defined area.

8. The method of claim 1, further comprising:
   determining, by the GPS engine, that one or more other users are within the defined area; and
   transmitting, by the GPS engine, a notification to the AR engine that the one or more other users are within the defined area.

9. The method of claim 8, further comprising:
   identifying, by the AR engine, the privilege level for each of the one or more other users within the defined area;
   determining, by the AR engine, that the privilege level for a subset of the one or more other users exceeds a predetermined privilege level; and
   providing, by the AR engine, the enhanced privileges in the defined area to the subset of the one or more other users.

10. The method of claim 1, further comprising:
    determining, via the GPS engine, that the user moved from a location inside of the defined area to another location outside of the defined area; and
    prohibiting the user from utilizing the enhanced privileges via the AR engine.

11. A computer system comprising:
    one or more processors;
    one or more memories; and
    one or more computer-readable hardware storage devices, the one or more computer-readable hardware storage devices containing program code executable by the one or more processors via the one or more memories to implement a method for providing location-based augmented reality (AR) administration and management, the method comprising:
      receiving login credentials from a user;
      identifying the user based on the login credentials and a privilege level associated with the user;
      granting the user access to an application of the computer system based on the identity of the user and the privilege level associated with the user;
      selecting the user to have enhanced privileges based on the identity of the user and the privilege level associated with the user;
      creating a defined area in the real world for the user;
      determining if the user is within the defined area;
      in response to a determining that the user is within the defined area, providing the enhanced privileges to the user; and
      in response to a determining that the user is outside of the defined area, prohibiting the user from utilizing the enhanced privileges.

12. The computer system of claim 11, wherein the enhanced privileges comprise granting the user increased interaction capabilities with digitally created content by the AR engine.

13. The computer system of claim 12, wherein the digitally created content is selected from the group consisting of: textual content, two-dimensional (2D) content, three-dimensional (3D) content, video content, and audio content.

14. The computer system of claim 11, wherein the method further comprises:
    modifying a size of the defined area.

15. The computer system of claim 11, wherein the method further comprises:
    determining that one or more other users are within the defined area.

16. The computer system of claim 15, wherein the method further comprises:
    identifying the privilege level for each of the one or more other users within the defined area;
    determining that the privilege level for a subset of the one or more other users exceeds a predetermined privilege level; and
    providing the enhanced privileges in the defined area to the subset of the one or more other users.

17. The computer system of claim 11, wherein the method further comprises:

determining that the user moved from a location inside of the defined area to another location outside of the defined area; and prohibiting the user from utilizing the enhanced privileges.

18. A computing device comprising at least:

an augmented reality (AR) engine;

a global positioning system (GPS) engine; and a camera, the AR engine being configured to:
  receive login credentials from a user;
  identify the user based on the login credentials and a privilege level associated with the user;
  grant the user access to the AR engine based on the identity of the user and the privilege level associated with the user;
  select the user to have enhanced privileges based on the identity of the user and the privilege level associated with the user,
    wherein the enhanced privileges comprise granting the user increased interaction capabilities with digitally created content by the AR engine, and
    wherein the digitally created content is selected from the group consisting of: textual content, two-dimensional (2D) content, three-dimensional (3D) content, video content, and audio content; and
  engage the GPS engine and/or the camera to create a defined area in the real world for the user; and the GPS engine being configured to:
  in response to determining that the user is within the defined area, provide enhanced privileges to the user; and
  in response to determining that the user is outside of the defined area, prohibit the user from utilizing the enhanced privileges.

19. The computing device of claim 18, wherein the GPS engine is further configured to:
  determine that one or more other users are within the defined area; and
  determine a notification to the AR engine that the one or more other users are within the defined area.

20. The computing device of claim 19, wherein the AR engine is further configured to:
  identify the privilege level for each of the one or more other users within the defined area;
  determine that the privilege level for a subset of the one or more other users exceeds a predetermined privilege level; and
  provide the enhanced privileges in the defined area to the subset of the one or more other users.

* * * * *